(12) United States Patent
Craft

(10) Patent No.: US 7,424,414 B2
(45) Date of Patent: Sep. 9, 2008

(54) SYSTEM FOR COMBINING DRIVING SIMULATORS AND DATA ACQUISITION SYSTEMS AND METHODS OF USE THEREOF

(75) Inventor: Frederick G. Craft, Holladay, UT (US)

(73) Assignee: Road Safety International, Inc., Thousands Oaks, CA (US)

(*) Notice: Subject to any disclaimer, the term of this patent is extended or adjusted under 35 U.S.C. 154(b) by 311 days.

(21) Appl. No.: 10/933,235

(22) Filed: Sep. 3, 2004

(65) Prior Publication Data
US 2005/0091018 A1    Apr. 28, 2005

Related U.S. Application Data

(60) Provisional application No. 60/500,238, filed on Sep. 5, 2003.

(51) Int. Cl.
G06G 7/48 (2006.01)
G09B 9/04 (2006.01)

(52) U.S. Cl. .............. 703/8; 434/65; 700/30; 700/31; 701/21

(58) Field of Classification Search ........ 703/6–8; 700/28–31; 715/704, 705; 434/47, 61, 62, 434/64–66, 69, 29; 340/576; 701/21; 705/1; 702/94
See application file for complete search history.

(56) References Cited

U.S. PATENT DOCUMENTS

| | | | | |
|---|---|---|---|---|
| 5,354,202 A | * | 10/1994 | Moncrief et al. | 434/69 |
| 5,366,376 A | * | 11/1994 | Copperman et al. | 434/69 |
| 5,368,484 A | * | 11/1994 | Copperman et al. | 434/69 |
| 5,547,382 A | * | 8/1996 | Yamasaki et al. | 434/61 |
| 5,607,308 A | * | 3/1997 | Copperman et al. | 434/62 |
| 5,618,179 A | * | 4/1997 | Copperman et al. | 434/69 |
| 5,660,547 A | * | 8/1997 | Copperman | 434/29 |
| 6,146,143 A | * | 11/2000 | Huston et al. | 434/69 |
| 6,227,862 B1 | * | 5/2001 | Harkness | 434/65 |
| 6,354,838 B1 | * | 3/2002 | Tagge et al. | 434/62 |
| 6,449,572 B1 | * | 9/2002 | Kurz et al. | 702/94 |
| 2002/0146667 A1 | * | 10/2002 | Dowdell et al. | 434/62 |
| 2004/0158476 A1 | * | 8/2004 | Blessinger et al. | 705/1 |
| 2004/0167761 A1 | * | 8/2004 | Sizov | 703/8 |

OTHER PUBLICATIONS

Rouse, W.B. Human-Computer Interaction in the Control of Dynamic Systems, ACM Computing Surveys (CSUR), vol. 13, No. 1, Mar. 1981, pp. 71-99.*

Al-Shihabi et al., T. A Framework for Modeling Human-Like Driving Behaviors for Autonomous Vehicles in Driving Simulators, Proceedings of the 5th International Conference on Autonomous Agents, May 2001, pp. 286-291.*

Salvucci, D.D. Predicting the Effects of In-Car Interfaces on Driver Behavior Using a Cognitive Architecture, Proceedings of the SIGCHI Conference on Human Factors in Computing Systems, vol. 3, No. 1, Mar. 2001, pp. 120-127.*

(Continued)

*Primary Examiner*—Russell Frejd
(74) *Attorney, Agent, or Firm*—Oblon, Spivak, McClelland, Maier & Neustadt, P.C.

(57) ABSTRACT

The present invention relates to systems and methods of integrating driving simulators, data acquisition systems such as, for example, event data recorders, and/or vehicles, as well as to methods of training or providing instruction to drivers using driving simulators, data acquisition systems and/or vehicles.

14 Claims, 5 Drawing Sheets

OTHER PUBLICATIONS

Stevens et al., A. Equipment and Methods for the Evaluation of Driver Performance in Relation to Vehicle Instrumentation, IEEE, 8th International Conference on Automotive Electronics, Oct. 1991, pp. 140-144.*

Song et al., J. Two Performance Measures for Evaluating Human Control Strategy, 1998 IEEE International Conference on Robotics and Automation, vol. 3, May 1998, pp. 2250-2255.*

Akamatsu, M. Measuring Driver Behavior, Proceedings of the 41st SICE Annual Conference, vol. 2, Aug. 2002, pp. 798-803.*

Yun et al., D.-S. The Concept for the Integration of Tele-Operated Unmanned Vehicle and Driving Simulator, IEEE International Symposium on Industrial Electronics, vol. 3, Jun. 2001, pp. 1419-1424.*

Yun et al., D.-S. The System Development of Unmanned Vehicle for the Tele-Operated System Interfaced with Driving Simulator, IEEE International Conference on Robotics and Automation, May 2001, pp. 686-691.*

* cited by examiner

SYSTEM FOR COMBINING DRIVING SIMULATORS AND DATA ACQUISITION SYSTEMS AND METHODS OF USE THEREOF

CROSS-REFERENCE TO RELATED APPLICATIONS

This application is based upon and claims the benefit of priority under 35 U.S.C. §119(e) from U.S. Provisional Application Ser. No. 60/500,238, filed Sep. 5, 2003, the entire contents of which is incorporated herein by reference.

BACKGROUND OF THE INVENTION

1. Field of the Invention

This invention relates generally to training and to providing feedback and/or instruction to operators of all types of vehicles. More specifically, the invention relates to systems and methods of integrating driving simulators, data acquisition systems such as, for example, event data recorders, and/or land-based or marine vehicles, as well as to methods of training or providing instruction to drivers using driving simulators, data acquisition systems and/or land-based or marine vehicles.

2. State of the Art

U.S. Pat. No. 6,146,143, issued Nov. 14, 2000, relates to a system for simulating the operation of a vehicle containing a monitor, a plurality of control devices for the simulated vehicle, a computer, and mechanisms for dynamically controlling weather effects and creating traffic events. This reference discloses a system for simulating the operation of a vehicle in various weather conditions.

U.S. Pat. No. 5,547,382, issued Aug. 20, 1996, relates to a motorcycle riding simulation system including a model motorcycle operated by a rider. A driven mount moves the model motorcycle to simulate riding conditions. This motorcycle simulator also contains a display showing scenery to the rider.

Similarly, other U.S. patents relate to simulators, mainly for entertainment purposes, having varying degrees of sophistication including an interactive racecar simulator system (U.S. Pat. No. 6,354,838, issued Mar. 12, 2002), a vehicle simulator with realistic operating feedback (U.S. Pat. No. 5,368,484, issued Mar. 4, 1994) and a vehicle simulator with low-frequency sound feedback (U.S. Pat. No. 5,607,308, issued Apr. 8, 1997).

However, to date, no system combines a simulator, a data acquisition system and/or a vehicle, or provides methods permitting training and/or providing real-time feedback to operators utilizing a simulator, a data acquisition system and/or a vehicle. Problems associated with this failure of prior systems include the lack of feedback or integration from the simulator to the vehicle, or vice versa, of the operator's actual performance during the training/instruction process, the inability to monitor and analyze the operator's performance in both the simulator and a vehicle, and the inability to provide real-time feedback to the operator during the training/instruction process.

SUMMARY OF THE INVENTION

The present invention addresses the problems discussed above. The present invention relates to driving simulators comprising a data acquisition system such as, for example, an event data recorder. The present invention also relates to methods for compiling and analyzing data related to a driver's performance comprising providing a driving simulator comprising a data acquisition system, permitting the driver to use the driving simulator, acquiring data relating to the driver's performance with the data acquisition system, and analyzing the data. Optionally, feedback regarding the driver's performance based on the acquired and/or analyzed data can be provided to the driver or another. Preferably, the acquired and/or analyzed data is used to provide driving training or instruction to a driver.

The present invention further relates to methods for compiling and analyzing data related to a driver's performance comprising providing a driving simulator comprising a data acquisition system, permitting the driver to use the driving simulator, acquiring data relating to the driver's performance in the driving simulator with the data acquisition system associated with the driving simulator, permitting the driver to use a land-based or marine vehicle, acquiring data relating to the driver's performance in the land-based or marine vehicle with a data acquisition system associated with the land-based or marine vehicle, and analyzing the data from the data acquisition system associated with the driving simulator and/or the data from the data acquisition system associated with the land-based or marine vehicle. Optionally, feedback regarding the driver's performance based on the acquired and/or analyzed data from one or more of the data acquisition systems can be provided to the driver or another. Preferably, the acquired and/or analyzed data is used to provide driving training or instruction to a driver.

The present invention also relates to methods for integrating a data acquisition system, a driving simulator, and a land-based or marine vehicle to provide driving instruction to a driver comprising interfacing said driving simulator with said data acquisition system, exchanging a first set of data between said driving simulator and said data acquisition system, terminating said interfacing of said driving simulator with said event data recorder, interfacing said data acquisition system with said land-based or marine vehicle, and exchanging a second set of data between said data acquisition system and said land-based or marine vehicle.

BRIEF DESCRIPTION OF THE DRAWINGS

To facilitate the understanding of certain aspects of the present invention, the description of the invention disclosed herein will be provided in part with reference to the specific embodiments illustrated in the appended drawings or figures, wherein like structures are identified with like reference designations. Certain aspects of the invention will be described and explained with additional specificity and detail by the use of the accompanying drawings, wherein.

DETAILED DESCRIPTION OF PREFERRED EMBODIMENTS

According to one preferred embodiment of the present invention, an apparatus or driver development system for compiling data related to a driver's performance comprising a driving simulator and a data acquisition system is provided, wherein said data acquisition system is interfaced with said driving simulator such that it acquires data related to a driver's performance from said driving simulator.

Referring to FIGS. 1-5, a driver development system 1 comprises a data acquisition system 2. The data acquisition system 2 can be any system which acquires or accumulates data related to a driver's performance on the driving simulator 4. Suitable data acquisition systems 2 include, but are not limited to, computer-like devices commonly known as event data recorders ("black boxes"), crash data recovery devices, sensing and diagnostic modules, data loggers, motor vehicle event data recorders, and the like. Preferably, the data acquisition system 2 is an event data recorder. Event data recorders are well-known and currently commercially available. Exemplary of commercially available event data recorders capable of providing real-time feedback is Road Safety International's RS-3000 On-Board Computer ("RS-3000"). The RS-3000 is described in Road Safety International's Base Station Reference Manual, which is hereby incorporated by reference in its entirety.

Figure 3:
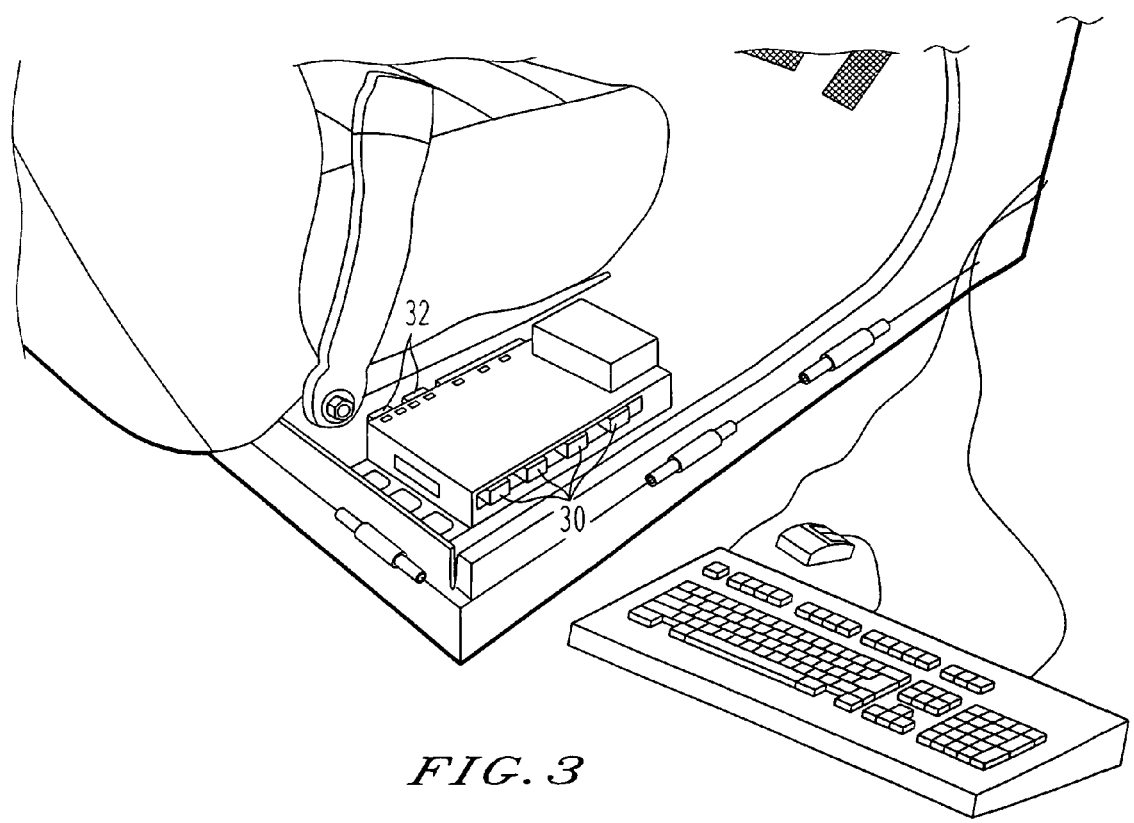
FIG. 3 illustrates a schematic view of an event data recorder useful in accordance with the present invention.

FIG. 3 illustrates an event data recorder. An event data recorder is a computer-like device capable of monitoring actual or simulated vehicle operating parameters, as well as actual or simulated kinematics forces, such as, for example, vehicle speed, engine RPM, vehicle stops, excess idle time, over speeds, over RPMs, ignition status, data produced by various vehicle sensors such as fuel level, oil pressure, coolant temperature, throttle position, brake activation, air bag deployment, ABS brake, and skid detection, and user-defined digital inputs such as brakes, turn signals, seat belts, emergency lights, vehicle warning lights, reverse, spotter switches and emergency brake.

In FIG. 3, the event data recorder is configured with ports 30 and 32, such as, for example, multiple RS-232 serial ports (30) and digital input/output channels (32), permitting communication with external devices. This configuration includes an interface to the vehicle system data link connector, or DLC, for direct communications with vehicle computer systems. Installation of an event data recorder in the vehicle 6 can be easily accomplished. For example, such installation can occur by connecting the event data recorder to the on-board computer via the vehicle DLC. The DLC of an on-board computer in the land-based or marine vehicle 6 interface preferably connects an energy source (for example, 12 volt vehicle battery power), vehicle ground, and data channel interface to at least one of the multiple communication ports on the event data recorder.

According to preferred embodiments, the data acquisition system 2 is configured and programmed such that it can be integrated to not only a driving simulator 4 but also to a land-based or marine vehicle 6, although it can be configured and programmed such that it is integrated to only a driving simulator 4. When the data acquisition system 2 is configured and programmed such that it can be integrated with both a driving simulator 4 and a land-based or marine vehicle 6, the driver development system 1 containing such a data acquisition system 2 is capable of compiling and analyzing data related to a driver's performance from the driving simulator 2 and/or the land-based or marine vehicle 6. This ability to compile and analyze data from both the driving simulator 2 and the land-based or marine vehicle 6 permits reporting to, providing feedback to, providing instruction to, and monitoring performance of drivers or others (such as, for example, insurance companies, governmental agencies such as motor vehicle departments or police departments, driving schools, etc.) based on the driver's performance in both the driving simulator 2 and the land-based or marine vehicle 6 which, in turn, permits quicker, more accurate, more comprehensive analysis and determination of the driver's performance and abilities.

Preferably, although not necessarily, the data acquisition system 2 can also be configured or programmed to contain or exhibit one or more of the following characteristics: (1) it can be configured to provide a downloadable time history of a driver's performance in a driving simulator 4 or a land-based or marine vehicle 6; (2) it can contain a memory card that can be removed and installed in a computer to display the data contained in the memory card; (3) it can be programmed to supervise the driver's performance by monitoring driver behavior and/or providing immediate feedback whenever the driver's performance deviates from pre-determined performance standards; (4) it can be interfaced with an accelerometer or other instrumentation in the driving simulator 4 or in the land-based or marine vehicle 6; and/or (5) it can be interfaced with an on-board GPS system.

In accordance with the present invention, the driving simulator 4 can be any suitable device or apparatus which permits simulation of a driving experience. Such driving simulators are well-known and currently commercially available. For example, the GE Capital I-Sim's PatrolSim™, the Doron's AMOS™ simulator, and the First Ann Arbor Corporation's DTSI™ simulator, are suitable driving simulators.

Figure 1:
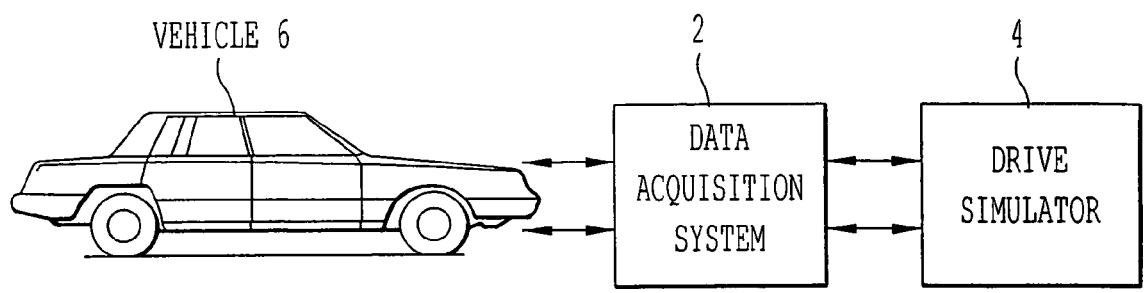
FIG. 1 illustrates a schematic diagram of a first embodiment of the present invention.
Figure 2:
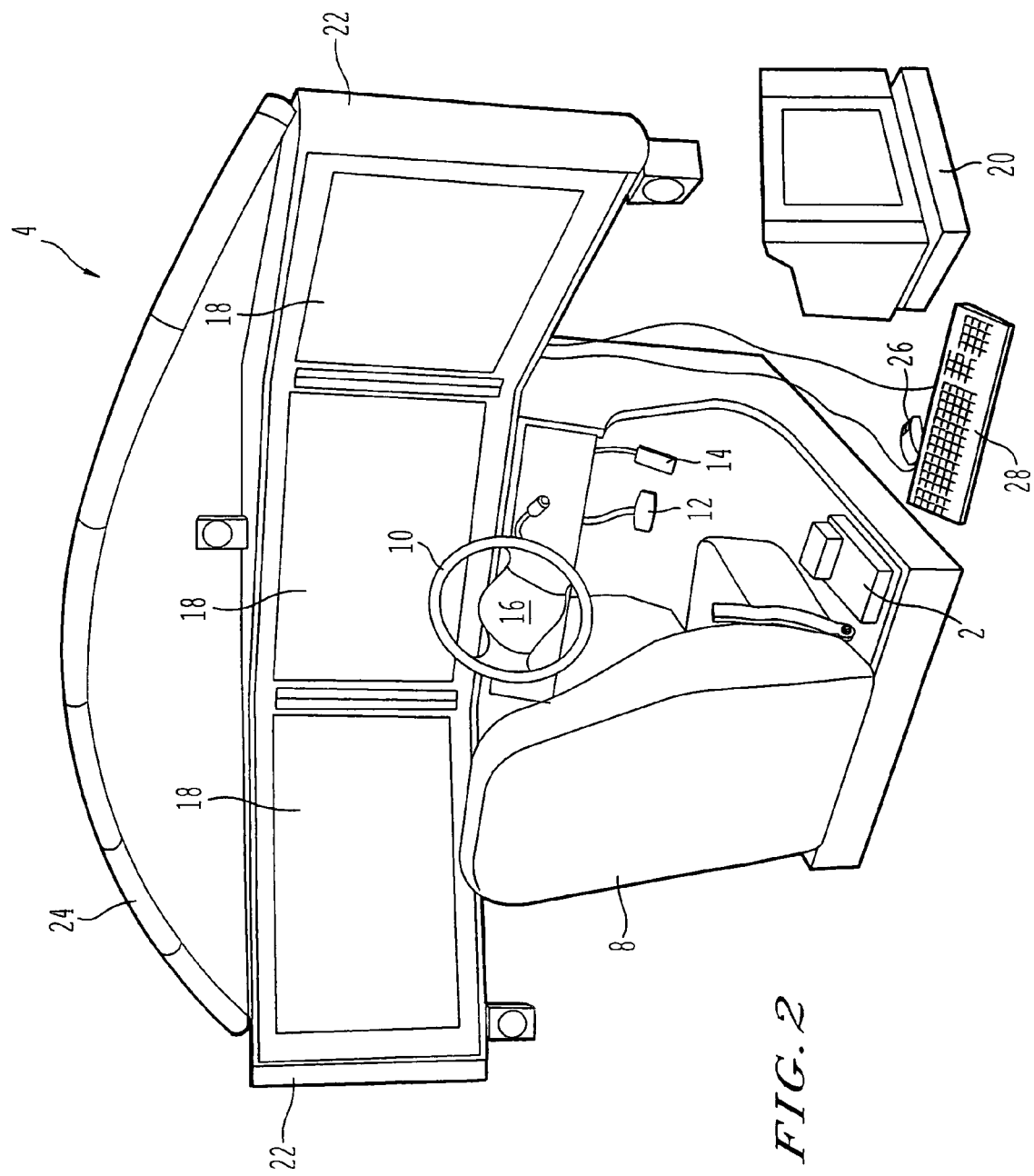
FIG. 2 illustrates a front elevation view of a driving simulator equipped with an event data recorder in accordance with one embodiment of the present invention.

FIG. 2 generally illustrates a suitable driving simulator 4. Typically, the driving simulator 4 may comprise a driver cockpit, a seat 8, a steering wheel 10, a brake 12, an accelerator pedal 14, ancillary controls (such as, for example, a horn 16, lights switch (not shown) and wiper switch (not shown)), and a projected instrumentation display (e.g., a speedometer (not shown)). The driving simulator 4 may also comprise a display system 22 having at least one display 18 mounted in front of the operator to provide a field of view from the operator position (for example, approximately 180 degree field of view), a structure 24 housing the display system 22, and a computer 20 having a mouse 26, a keyboard 28, and other computer hardware and software for providing a virtual environment (e.g., scenario control, dynamics models for all moving objects in the simulation, overall simulation control interfaces, and embedded multimedia (audio, visual) containing instructional material). In addition, the multimedia embedded in the simulator, if present, may contain instructional material that is relevant to various training objectives and operator actions throughout the simulator-based training. Although the driving simulator 4 shown in FIG. 2 is illustrated as a driving simulator for a car, it should be understood that the invention disclosed herein is also applicable to other types of vehicles as well.

The vehicle 6 of the present invention is preferably any vehicle which operates on land or water. Suitable land-based vehicles include, but are not limited to, cars, buses, trucks, heavy equipment (such as a crane), ambulances, fire/rescue cars and trucks, police cars, airport crash/rescue vehicles, and the like. Suitable marine vehicles include, but are not limited to, boats, ships, barges, and the like. However, the vehicle 6 may also be an air-born vehicle such as an airplane, if desired.

The data which is compiled, acquired and/or analyzed from the driving simulator 2 and/or the land-based or marine vehicle 6 is any data relating to the driver's performance in the driving simulator 2 and/or land-based or marine vehicle 6. Suitable data include, but are not limited to, data related to the operation and/or function of the driving simulator 4 and/or land-based or marine vehicle 6 such as, for example, driver inputs, vehicle/simulator responses, speed, handling, braking, seat-belt usage, etc.

The driver can be any person who operates a land-based or marine vehicle. Thus, the driver can be a student or novice driver who is learning how to drive, an experienced or licensed driver who is being evaluated or further trained, etc.

In accordance with preferred embodiments of the present invention, a method for integrating a data acquisition system, a driving simulator, and a land-based or marine vehicle to provide driving instruction to a driver comprising interfacing said driving simulator with said data acquisition system, exchanging a first set of data between said driving simulator and said data acquisition system, terminating said interfacing of said driving simulator with said event data recorder, interfacing said data acquisition system with said land-based or marine vehicle, and exchanging a second set of data between said data acquisition system and said land-based or marine vehicle is provided.

In accordance with these embodiments, the driving simulator 4 is interfaced with the data acquisition system 2, preferably an event data recorder, by any suitable means that would allow a first set of data to be exchanged between the driving simulator 4 and the data acquisition system 2. After the first set of data has been exchanged, the interface between the data acquisition system 2 and the driving simulator 4 is terminated. At this point, the data acquisition system 2 contains the first set of data which may either be retained in the data acquisition system 2 or downloaded to an outside data storage unit such as a computer 20 (this downloading may occur at the same time the second set of data is downloaded to the computer 20 or after such downloading occurs, if desired). The data acquisition system 2 is then interfaced with the land-based or marine vehicle 6 by any suitable means that would allow a second set of data to be exchanged between the data acquisition system 2 and the land-based or marine vehicle 6. The second set of data may either be retained in the data acquisition system 2 or downloaded to an outside data storage unit such as the computer 20. The first set of data relates to operation of the driving simulator 4 by a driver and the second set of data relates to operation of the land-based or marine vehicle 6 by a driver, preferably the same driver. Preferably, the same data acquisition system 2 is used to acquire data from both the driving simulator 4 and the land-based or marine vehicle 6, although different data acquisition systems can be used, if desired.

Once the first and/or second sets of data have been compiled by the data acquisition system 2, one or both sets of data can be analyzed. For purposes of all embodiments of the present invention, "analyzing data" means manipulating, reflecting, contemplating or in any way working with data. The acquired and/or analyzed data from the driving simulator 4 and/or the land-based or marine vehicle 6 can be used to provide driving training and/or instruction to a driver.

Training and/or instruction include, but are not limited to, written, visual, or audio feedback provided to a driver for purposes of creating, developing, evaluating and/or improving his or her driving skills. The feedback may be provided by either a person such as, for example, an instructor providing driving lessons, or a machine such as, for example, a driving simulator through loud speakers, displays, or production of a written report. Such feedback may also include a rating or evaluation of the driver's performance against a set of predetermined driving performance standards. Moreover, the feedback can be provided in real-time (that is, substantially instantaneously) or at any time subsequent to the driver's utilizing the driving simulator 4 and/or land-based or marine vehicle 6.

For example, a driver's performance report may be generated based on the first set of data, the second set of data, or both, and this report may be provided to the driver in oral, written and/or visual form, either in real-time or at some time in the future.

Figure 4:
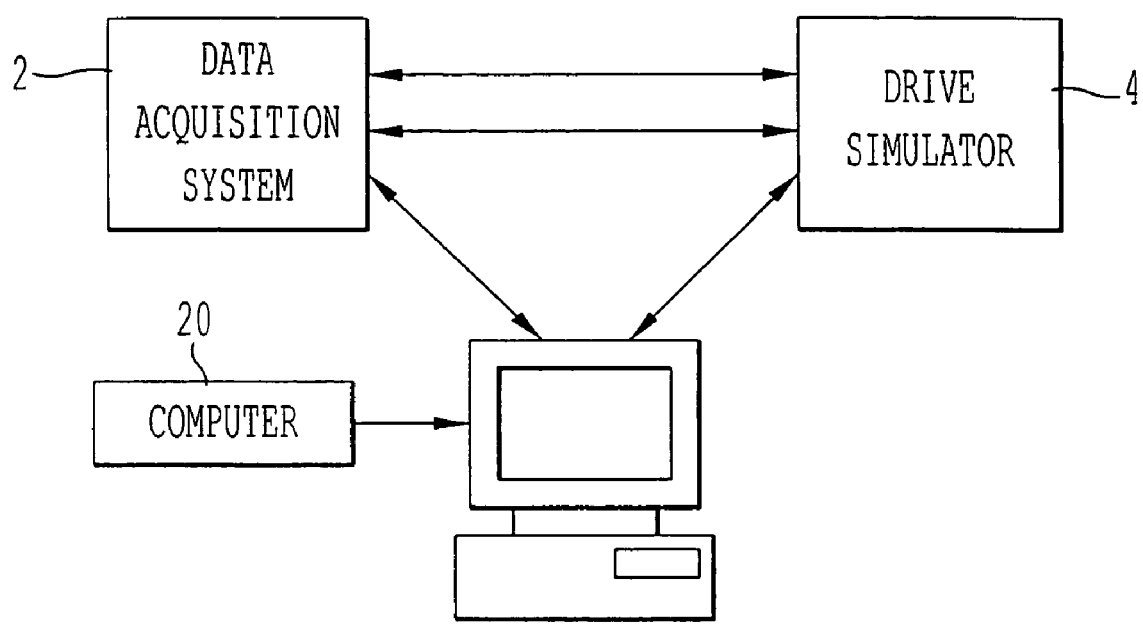
FIG. 4 illustrates a schematic diagram of a second embodiment of the present invention.

In accordance with other preferred embodiments, a method for compiling and analyzing data related to a driver's performance comprising providing a driving simulator comprising a data acquisition system, preferably an event data recorder, permitting the driver to use the driving simulator, acquiring data relating to the driver's performance with the data acquisition system, and analyzing the data is provided. FIG. 4 illustrates these embodiments. In accordance with these embodiments, the definitions of all terms and elements is set forth above.

According to yet other preferred embodiments of the present invention, a method for providing driving training or instruction to a driver comprising providing a driving simulator comprising a data acquisition system, permitting the driver to use the driving simulator, acquiring data relating to the driver's performance with the data acquisition system, analyzing the data, and providing feedback to the driver is provided. In accordance with these embodiments, the definitions of all terms and elements is set forth above.

Figure 5:
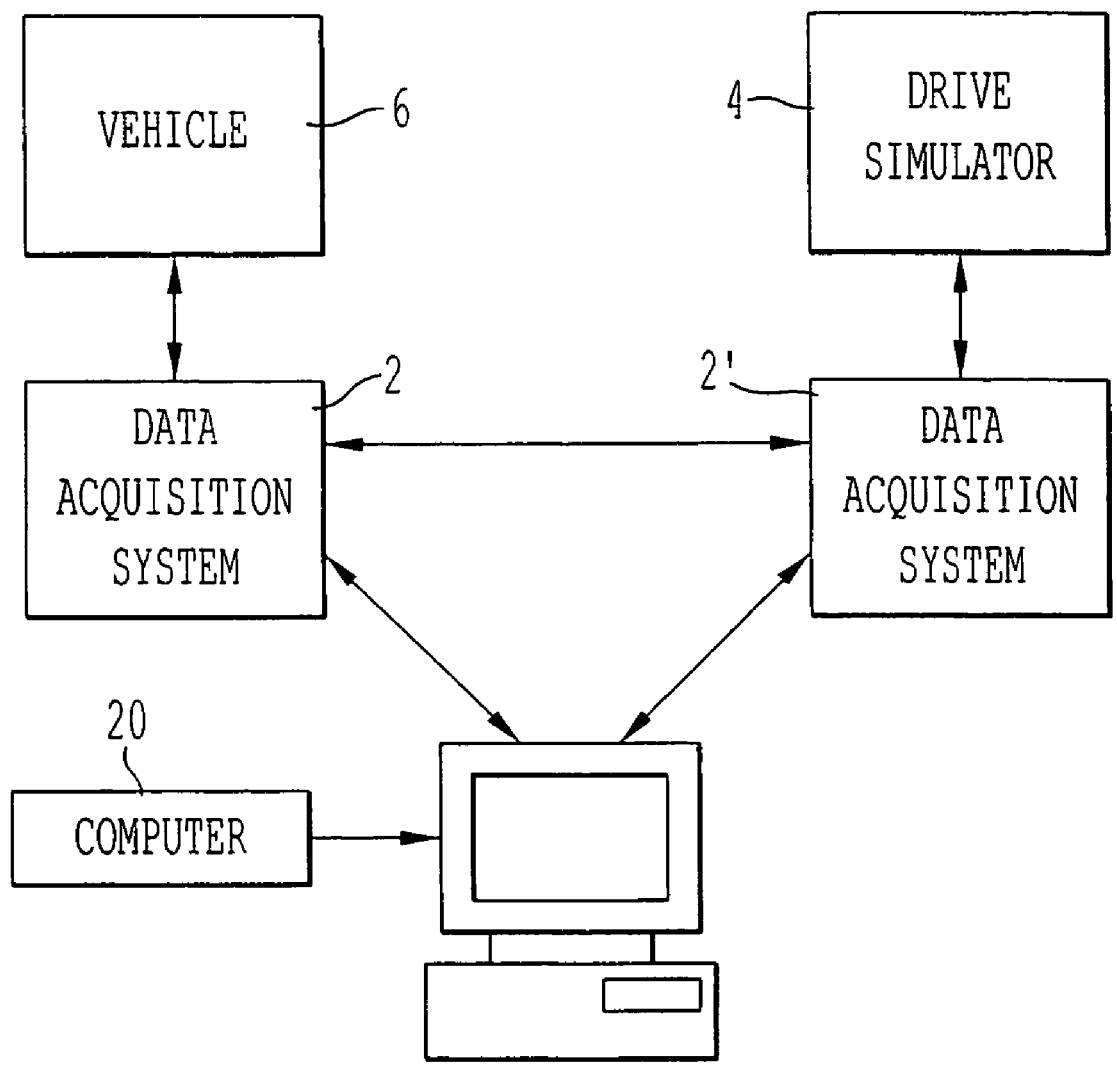
FIG. 5 illustrates a schematic diagram of a third embodiment of the present invention.

According to preferred embodiments of the present invention, a method for compiling and analyzing data related to a driver's performance comprising providing a driving simulator comprising a data acquisition system, permitting the driver to use the driving simulator, acquiring data relating to the driver's performance in the driving simulator with the data acquisition system associated with the driving simulator, permitting the driver to use a vehicle, acquiring data relating to the driver's performance in the vehicle with a data acquisition system associated with the vehicle, and analyzing the data from the data acquisition system associated with the driving simulator and/or the data from the data acquisition system associated with the vehicle is provided. These embodiments are illustrated in FIG. 5. In accordance with these embodiments, the definitions for all terms and elements are set forth above.

Although specific embodiments and details have been described herein, it should be understood that such embodiments are exemplary and that non-disclosed modifications and changes can be made to the disclosed methods, apparatuses, and systems without straying from the scope of the present invention.

What is claimed is:

1. A method for obtaining performance data used to provide driving instruction to a driver, comprising:
   interfacing a driving simulator with a data acquisition system;
   acquiring a first set of performance data from said data acquisition system based on interaction of the driver with the driving simulator;
   terminating said interfacing of said driving simulator with said data acquisition system;
   interfacing said data acquisition system with a vehicle;
   acquiring a second set of performance data from said data acquisition system based on interaction of the same driver with said vehicle;
   providing real-time driving instruction to the driver based on the automatic analysis of the first set of performance data and the second set of performance data.

2. The method of claim 1, wherein said first set of performance data comprises data related to operation of said driving simulator by said driver and said second set of performance data comprises data related to operation of said vehicle by said driver.

3. The method of claim 2, further comprising:
generating a driving performance report based on at least said first set of performance data.

4. The method of claim 2, further comprising:
generating a driving performance report based on at least the second set of performance data.

5. The method of claim 3, wherein the driving performance report is also based on at least the second set of performance data.

6. The method of claim 1, wherein said data acquisition system is an event data recorder.

7. A computer-implemented method for monitoring a driver's performance, comprising:
acquiring first data relating to the driver's performance in a driving simulator from a first data acquisition system associated with the driving simulator;
acquiring second data relating to the same driver's performance in a vehicle from a second data acquisition system associated with the vehicle; and
automatically analyzing the first data and the second data to generate real-time feedback information;
wherein the first data acquisition system is the same data acquisition system as the second data acquisition system.

8. The method of claim 7, wherein the first data acquisition system is an event data recorder.

9. A method for obtaining performance data used to provide driving instruction to a driver, comprising:
interfacing a vehicle with a data acquisition system;
acquiring a first set of performance data from said data acquisition system based on interaction of the driver with the vehicle;
terminating said interfacing of said vehicle with said data acquisition system;
interfacing said data acquisition system with a driving simulator;
acquiring a second set of performance data from said data acquisition system based on interaction of the same driver with said driving simulator;
providing real-time driving instruction to the driver based on the automatic analysis of the first set of performance data and the second set of performance data.

10. The method of claim 9, wherein said first set of performance data comprises data related to operation of said vehicle by said driver and said second set of performance data comprises data related to operation of said driving simulator by said driver.

11. The method of claim 10, further comprising:
generating a driving performance report based on at least said first set of performance data.

12. The method of claim 10, further comprising:
generating a driving performance report based on at least the second set of performance data.

13. The method of claim 11, wherein the driving performance report is also based on at least the second set of performance data.

14. The method of claim 9, wherein said data acquisition system is an event data recorder.

* * * * *